US012394243B1

United States Patent
Xie et al.

(10) Patent No.: US 12,394,243 B1
(45) Date of Patent: Aug. 19, 2025

(54) METHOD FOR MATCHING FINGERPRINT IMAGE BASED ON TRANSFORMER

(71) Applicants: Shenzhen Magic Information Technology Co., LTD., Guangdong (CN); Zhejiang Desman Intelligent Technology Co., LTD., Zhejiang (CN)

(72) Inventors: Yonghui Xie, Guangdong (CN); Shengwei Sang, Guangdong (CN); Juan Xi, Guangdong (CN); Jin Qin, Guangdong (CN); Hanqin Chen, Guangdong (CN); Tianbao Li, Guangdong (CN); Weiwen Yang, Guangdong (CN)

(73) Assignee: Shenzhen Magic Information Technology Co., LTD., Guangdong (CN)

( * ) Notice: Subject to any disclaimer, the term of this patent is extended or adjusted under 35 U.S.C. 154(b) by 0 days.

(21) Appl. No.: 19/092,876

(22) Filed: Mar. 27, 2025

(30) Foreign Application Priority Data

Mar. 29, 2024 (CN) .......................... 202410370348.3

(51) Int. Cl.
*G06V 40/12* (2022.01)
*G06V 10/75* (2022.01)
(Continued)

(52) U.S. Cl.
CPC ........ *G06V 40/1371* (2022.01); *G06V 10/757* (2022.01); *G06V 10/7715* (2022.01); *G06V 10/82* (2022.01); *G06V 40/1353* (2022.01)

(58) Field of Classification Search
CPC ............. G06V 40/1371; G06V 10/757; G06V 10/7715; G06V 10/82; G06V 40/1353
See application file for complete search history.

(56) References Cited

U.S. PATENT DOCUMENTS

2008/0013804 A1* 1/2008 Moon ..................... G06F 21/32
382/124
2017/0300739 A1* 10/2017 Suwald .............. G06V 40/1365
(Continued)

FOREIGN PATENT DOCUMENTS

CN          107273878 A     10/2017
CN          112150568 A     12/2020
(Continued)

OTHER PUBLICATIONS

Tangshan University Journal, No. 3; Author name: Zhang Hang and Ma Jun; Research on Fingerprint Identification Base on Two Process of Matching; Date of Issue: May 20, 2011.

*Primary Examiner* — Ming Y Hon
(74) *Attorney, Agent, or Firm* — Taft Stettinius & Hollister LLP; Stephen F. Rost (57) ABSTRACT

The disclosure relates to the technical field of smart door locks. Disclosed is a method for matching a fingerprint image based on Transformer. The method includes: acquiring a fingerprint image to be matched; obtaining a first feature point set of the fingerprint image to be matched by performing Transformer feature extraction on the fingerprint image to be matched; and generating a matching result by performing, based on a second feature point set of a standard fingerprint image, a preset number of levels of Transformer matches between the first feature point set and the second feature point set. According to the disclosure, global information of a fingerprint can be captured by performing a fingerprint match by using a Transformer algorithm. Thus, an identification failure caused by an abnormality of partial fingerprint information is avoided, and accuracy of the fingerprint match is improved.

7 Claims, 5 Drawing Sheets

(51) Int. Cl.
*G06V 10/77* (2022.01)
*G06V 10/82* (2022.01)

(56) References Cited

U.S. PATENT DOCUMENTS

| | | |
|---|---|---|
| 2022/0318557 A1 | 10/2022 | Mohseni et al. |
| 2023/0092619 A1* | 3/2023 | Li ........................ G06V 10/774 |
| | | 382/155 |
| 2024/0265718 A1* | 8/2024 | Zhang ..................... G06F 18/00 |
| 2024/0321449 A1* | 9/2024 | Lambert ................. G16H 30/40 |
| 2024/0412553 A1* | 12/2024 | Jain ........................ G06V 10/82 |

FOREIGN PATENT DOCUMENTS

| | | |
|---|---|---|
| CN | 116524583 A | 8/2023 |
| CN | 116935449 A | 10/2023 |

\* cited by examiner

METHOD FOR MATCHING FINGERPRINT IMAGE BASED ON TRANSFORMER

TECHNICAL FIELD

The disclosure relates to the technical field of smart door locks, and in particular to a method for matching a fingerprint image based on Transformer.

BACKGROUND

The small-area fingerprint identification technology has been rapidly developed in the field of mobile devices since it was applied to smartphones for the first time. A variety of products based on the fingerprint identification technology such as fingerprint universal serial bus flash disks, fingerprint door locks, and fingerprint luggage are available on the market, showing a sustaining increase in sales volume. However, fingerprints collected by fingerprint collection sensors on these mobile devices are different from those used by traditional fingerprint identification systems. With a relatively small size, these sensors can only capture a small part of fingerprint information. An insufficient number (usually less than 10) of traditional fingerprint identification feature points (fingerprint minutiae) extracted from such a small-area fingerprint cannot satisfy requirements of traditional algorithms for the number of minutiae.

An initial small-area fingerprint identification algorithm principally uses a scale-invariant feature transform (SIFT) matching algorithm. Compared with the fingerprint minutiae, feature points for such an algorithm are also hand-designed by experts, but have higher density. Thus, the number of feature points satisfying matching requirements can be obtained from the small-area fingerprint. However, the stability and permanent invariance of SIFT feature points have yet to be verified. Generally, products using such an identification algorithm are defective in the following three aspects: first, identification performance drops sharply in the face of finger molting during season change; second, identification performance drops dramatically when a finger surface is too dry or too wet; and third, identification performance drops considerably when the finger surface is dirty or dusty. In consequence, it is impossible to open a door due to low accuracy of a fingerprint match.

SUMMARY OF THE INVENTION

In view of the above, the disclosure provides a method for matching a fingerprint image based on Transformer, so as to solve low accuracy of a fingerprint match.

In a first aspect, the disclosure provides a method for matching a fingerprint image based on Transformer. The method includes:

acquiring a fingerprint image to be matched;

obtaining a first feature point set of the fingerprint image to be matched by performing Transformer feature extraction on the fingerprint image to be matched; and generating a matching result by performing, based on a second feature point set of a standard fingerprint image, a preset number of levels of Transformer matches between the first feature point set and the second feature point set.

In the method for matching a fingerprint image based on Transformer according to the example of the disclosure, the first feature point set of the fingerprint image to be matched is obtained by performing the Transformer feature extraction on the acquired fingerprint image to be matched. The matching result is generated by performing, based on the second feature point set of the standard fingerprint image, the preset number of levels of Transformer matches between the first feature point set and the second feature point set. According to the disclosure, global information of a fingerprint can be captured by performing a fingerprint match by using a Transformer algorithm. Thus, an identification failure caused by an abnormality of partial fingerprint information is avoided, and accuracy of the fingerprint match is improved.

In a possible embodiment, the obtaining a first feature point set of the fingerprint image to be matched by performing Transformer feature extraction on the fingerprint image to be matched includes: obtaining a feature tensor map and a confidence heat map by extracting an initial feature from the fingerprint image to be matched by using an initial feature extraction model, where the feature tensor map represents a feature vector of each pixel in the fingerprint image to be matched, and the confidence heat map represents a confidence of each pixel in the fingerprint image to be matched; obtaining an initial point set containing location information and the confidence thereof by performing non-maximum suppression processing on the confidence heat map; obtaining a feature vector set corresponding to the initial point set by traversing the initial point set according to the feature tensor map; and obtaining the first feature point set by updating each feature vector in the feature vector set by using a Transformer feature model, where the first feature point set includes the location information, the confidence thereof, and updated feature vectors of all feature points.

According to the disclosure, the location information, the confidence thereof, and the feature vector of the feature point in the fingerprint can be obtained by extracting the feature from the fingerprint. The fingerprint image is converted into a sparse initial point set mode, so that the feature points can be matched according to relevant information of the feature points.

In a possible embodiment, the updating each feature vector in the feature vector set by using a Transformer feature model includes: taking each feature vector in the feature vector set as an input-layer node of the Transformer feature model sequentially, where the Transformer feature model has a preset number of layers; generating next-layer nodes by iterating current-layer nodes by using a self-attention mechanism with an input layer as a starting layer, and performing iteration sequentially until output-layer nodes are obtained; and taking the output-layer nodes as the updated feature vectors corresponding to the feature points.

According to the disclosure, after the initial feature is extracted from the fingerprint, the feature vector obtained is updated. Thus, a high-dimensional feature vector including partial information and global context information can be obtained to provide richer and more reliable feature point information for the fingerprint match.

In a possible embodiment, the Transformer match is performed between the first feature point set and the second feature point set by using the preset number of levels of Transformer matching models. Each level of Transformer matching model has different number of layers. A matching process thereof includes: taking each feature point in the first feature point set and each feature point in the second feature point set respectively as input-layer nodes of a first level of Transformer matching model; iterating even-layer nodes by using the self-attention mechanism and iterating odd-layer nodes by using a cross-attention mechanism with the input layer as a starting layer, and performing the iteration sequentially until the output-layer nodes are obtained; taking the output-layer nodes as corresponding updated feature vectors of the first feature point set or the second feature point set; calculating a matching probability according to the corresponding updated feature vector of each feature point in the first feature point set and the second feature point set; if the matching probability is higher than a matching probability threshold, determining the matching result; and if the matching probability is lower than a matching probability threshold, performing a match by inputting the updated feature vectors into a next level of Transformer matching model until the matching result is determine.

According to the disclosure, the fingerprint match is performed by using a plurality of levels of Transformer match models. The global information and context information of the fingerprint can be learned by using the self-attention mechanism and the cross-attention mechanism, and dependence relations between different feature points of the fingerprint can be captured. Thus, the accuracy of the fingerprint match can be improved, and the identification failure caused by the abnormality of the partial fingerprint information can be avoided.

In a possible embodiment, the calculating a matching probability according to the corresponding updated feature vector of each feature point in the first feature point set and the second feature point set includes: calculating a matching confidence for each feature point in the first feature point set or the second feature point set according to the corresponding updated feature vector, where a calculation formula thereof is as follows:

$$\sigma_i^I = \frac{1}{1 + e^{w^T * Ix_i + b}}$$

In the formula, $I \in \{A, B\}$, A denotes the first feature point set, B denotes the second feature point set, $Ix_i$ denotes is a feature vector of a feature point i in A or B, $w^T$ denotes a linear transformation matrix, and b denotes an offset of the linear transformation matrix; performing indicative function calculation on the matching confidence according to a highest probability threshold and a lowest probability threshold, where a calculation formula thereof is as follows:

$$\chi(\sigma_i^I > C_H) = \begin{cases} 1, & \sigma_i^I > C_H \text{ is true} \\ 0, & \sigma_i^I > C_H \text{ is false} \end{cases}$$

$$\chi(\sigma_i^I > C_L) = \begin{cases} 1, & \sigma_i^I > C_L \text{ is true} \\ 0, & \sigma_i^I > C_L \text{ is false} \end{cases}$$

In the formula, $C_H$ denotes the highest probability threshold, and $C_L$ denotes the lowest probability threshold; and calculating a matching success probability and a matching failure probability according to an indicative function calculation result corresponding to the first feature point set and an indicative function calculation result corresponding to the second feature point set, where a calculation formula thereof is as follows:

$$R_H = \frac{\sum_{i=1}^{m} \chi(\sigma_i^A > C_H) + \sum_{i=1}^{n} \chi(\sigma_i^B > C_H)}{m + n} \in [0, 1]$$

-continued
$$R_L = \frac{\sum_{i=1}^{m} \chi(\sigma_i^A < C_L) + \sum_{i=1}^{n} \chi(\sigma_i^B < C_L)}{m + n} \in [0, 1]$$

In the formula, $R_H$ denotes the matching success probability, $R_L$ denotes the matching failure probability, m denotes a number of the feature points in the first feature point set, and n denotes a number of the feature points in the second feature point set.

According to the disclosure, the matching result of each level of Transformer matching model is determined. The matching result can be rapidly determined when the fingerprint has no abnormality and the matching result is clear. A speed of the fingerprint match can be further increased on the basis of ensuring the reliability and accuracy of the fingerprint match.

In a possible embodiment, the step of, if the matching probability is higher than a matching probability threshold, determining the matching result includes: if the matching success probability is higher than a matching success probability threshold, determining the matching result to be a matching success; and if the matching failure probability is higher than a matching failure probability threshold, determining the matching result to be a matching failure.

According to the disclosure, the matching result is rapidly determined in a case that a fingerprint matching degree is extremely high or extremely low. Thus, a plurality of levels of subsequent Transformer matches can be avoided, the time for the fingerprint match can be shortened while the matching result is correct and reliable.

In a possible embodiment, if no matching result is determined before a final level of Transformer matching model, determining the matching result by using the final level of Transformer matching model, and a determining process thereof includes: obtaining a matchable feature by performing linear projection transformation on an updated feature vector that is output by the final level of Transformer matching model; calculating matching degrees between the feature points in the first feature point set and the feature points in the second feature point set according to the matchable feature; and obtaining a score matrix by normalizing the matching degrees, and determining the matching result by performing consistency matching calculation by using a preset matching algorithm.

According to the disclosure, the plurality of levels of Transformer matches are performed on the fingerprint, so that determination can be fully carried out according to the global information and the context information of the fingerprint in a case that partial fingerprint information is missing, and reliability of a final matching result is ensured.

In a possible embodiment, before the fingerprint image is matched, the method further includes: acquiring a transformation relation between two real matched images having a known matching result; machine-learning and training a Transformer matching process according to the transformation relation based on a matching loss function; machine-learning and training a confidence heat map extraction sub-process in a Transformer feature extraction process according to the transformation relation based on a confidence heat map loss function formed by a weighted combination of a cosine similarity loss function of the confidence heat map and a sparsity loss function of the confidence heat map; machine-learning and training the Transformer feature extraction process according to the transformation relation based on a feature extraction loss function formed by a weighted combination of the confidence heat map loss function and a joint loss function of the feature tensor map and the confidence heat map; and jointly machine-learning and training the Transformer matching process and the Transformer feature extraction process based on a comprehensive loss function formed by a weighted combination of the matching loss function and the feature extraction loss function.

According to the disclosure, the accuracy and reliability of feature extraction and feature matching can be further ensured by performing independent machine-learning and training and joint machine-learning and training on the models involved in the fingerprint matching process, and the accuracy and reliability of the fingerprint match can be improved.

In a second aspect, the disclosure provides an apparatus for matching a fingerprint image based on Transformer. The apparatus includes:
  an image acquisition module configured to acquire a fingerprint image to be matched;
  a feature extraction module configured to obtain a first feature point set of the fingerprint image to be matched by performing Transformer feature extraction on the fingerprint image to be matched; and
  a fingerprint match module configured to generate a matching result by performing, based on a second feature point set of a standard fingerprint image, a preset number of levels of Transformer matches between the first feature point set and the second feature point set.

In the apparatus for matching a fingerprint image based on Transformer according to the example of the disclosure, the first feature point set of the fingerprint image to be matched is obtained by performing the Transformer feature extraction on the acquired fingerprint image to be matched. The matching result is generated by performing, based on the second feature point set of the standard fingerprint image, the preset number of levels of Transformer matches between the first feature point set and the second feature point set. According to the disclosure, global information of a fingerprint can be captured by performing a fingerprint match by using a Transformer algorithm. Thus, an identification failure caused by an abnormality of partial fingerprint information is avoided, and accuracy of the fingerprint match is improved.

In a third aspect, the disclosure provides a computer device. The computer device includes a memory and a processor; where the memory is in intercommunication connection with the processor, the memory has computer instructions stored therein, and the processor is configured to execute the computer instructions to perform the method for matching a fingerprint image based on Transformer in the above first aspect or any embodiment corresponding to the first aspect.

In a fourth aspect, the disclosure provides a computer-readable storage medium. The computer-readable storage medium has computer instructions stored therein, where the computer instructions are configured to cause a computer to perform the method for matching a fingerprint image based on Transformer in the above first aspect or any embodiment corresponding to the first aspect.

In a fifth aspect, the disclosure provides a computer program product. The computer program product includes computer instructions, where the computer instructions are configured to cause a computer to perform the method for matching a fingerprint image based on Transformer in the above first aspect or any embodiment corresponding to the first aspect.

In a sixth aspect, the disclosure provides a smart door lock. The smart door lock includes the computer device in the above third aspect.

BRIEF DESCRIPTION OF THE DRAWINGS

In order to describe the technical solutions in particular embodiments of the disclosure or in the prior art more clearly, the accompanying drawings required for describing the particular embodiments or the prior art are briefly described below. Apparently, the accompanying drawings in the following description show some embodiments of the disclosure. Those of ordinary skill in the art can also derive other accompanying drawings from these accompanying drawings without creative efforts.

DETAILED DESCRIPTION

In order to make the objectives, technical solutions, and advantages in examples of the disclosure clearer, the technical solutions in the examples of the disclosure are clearly and completely described below with reference to the accompanying drawings in the examples of the disclosure. Apparently, the examples described are some examples rather than all examples of the disclosure. Based on the examples of the disclosure, all other examples derived by those skilled in the art without creative efforts fall within the scope of protection of the disclosure.

The examples of the disclosure are applicable to a scene where a user opens a smart door lock through a fingerprint. For example, the related art of performing a fingerprint match by using a scale-invariant feature transform (SIFT) feature algorithm focuses on a partial region only. Then, an overall similarity is determined through comprehensive voting. In the face of fingerprint image changes caused by molting, drying, wetting, wrinkles, or dust, the fingerprint has highly-characteristic non-linear changes in this case, which leads to an abnormality of a partial feature. In consequence, a matching process in the related art will be seriously affected, and identification performance will drop sharply. In a method for matching a fingerprint image based on Transformer according to an example of the disclosure, by performing a fingerprint match by using a Transformer algorithm, accuracy of the fingerprint match is improved.

The example of the method for matching a fingerprint image based on Transformer is provided according to the examples of the disclosure. It should be noted that steps shown in the flowcharts of the accompanying drawings can be executed in a computer system, such as a set of computer-executable instructions. Moreover, although logic sequences are shown in the flowcharts, in some cases, the steps shown or described can be executed in an order different from those herein.

Figure 1:
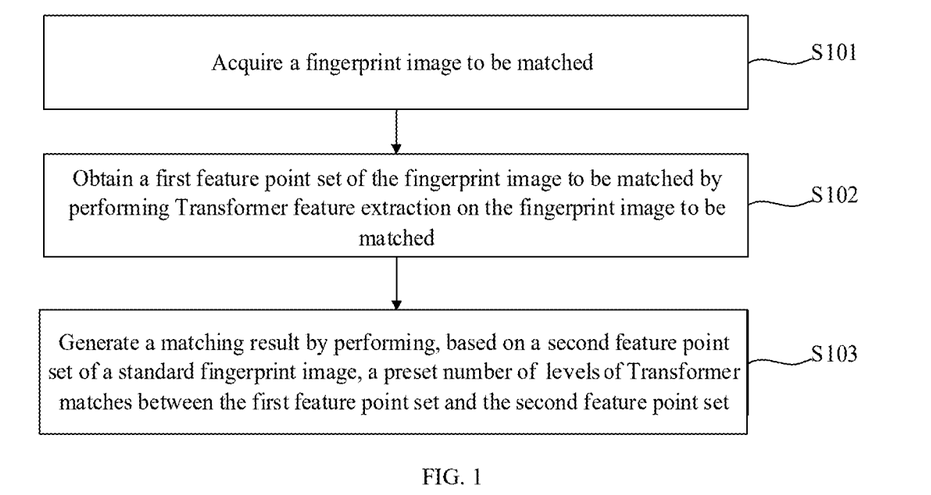
FIG. 1 is a schematic flowchart of a method for matching a fingerprint image based on Transformer according to an example of the disclosure.

The method for matching a fingerprint image based on Transformer according to the example may be used for the above mobile terminal such as the smart door lock. FIG. 1 is a flowchart of a method for matching a fingerprint image based on Transformer according to an example of the disclosure. As shown in FIG. 1, the flow includes:

S101, a fingerprint image to be matched is acquired.

Specifically, in the example of the disclosure, a user mounts the smart door lock on a home entrance door or an office door, and opens the door lock by pressing a finger on a fingerprint collection region of the smart door lock. In this case, the smart door lock collects a fingerprint image of the finger of the user, and takes the image collected as the fingerprint image to be matched.

S102, a first feature point set of the fingerprint image to be matched is obtained by performing Transformer feature extraction on the fingerprint image to be matched.

Figure 2:
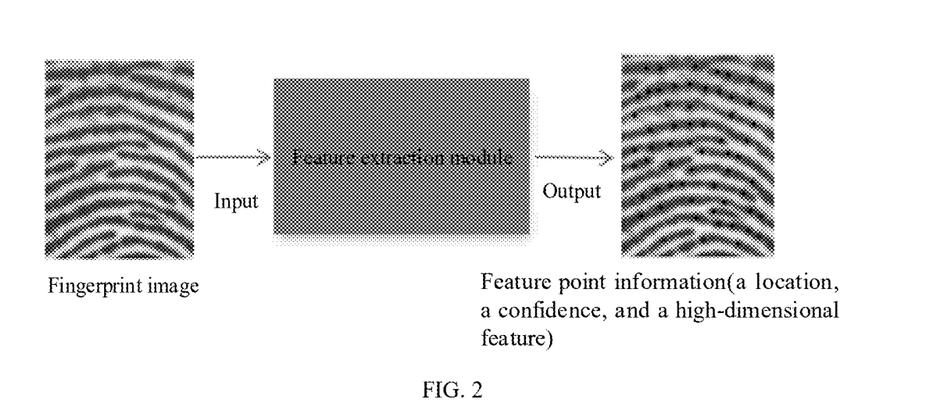
FIG. 2 is a schematic map of feature extraction of a method for matching a fingerprint image based on Transformer according to an example of the disclosure.

Specifically, in the example of the disclosure, the fingerprint image to be matched can be converted into a sparse initial point set mode by performing the Transformer feature extraction on the fingerprint image to be matched, as shown in FIG. 2. The extracted feature point set includes location information (a pixel coordinate of the feature point in the fingerprint image to be matched), a confidence (a probability measure of a quality and reliability of the feature point), and a feature vector (a multidimensional feature vector, representing differential information of a whole with the point as a center) of each feature point. After the Transformer feature extraction, the feature point set obtained includes global information and partial information of the finger collected to provide a sufficient amount of information for a Transformer match.

S103, a matching result is generated by performing, based on a second feature point set of a standard fingerprint image, a preset number of levels of Transformer matches between the first feature point set and the second feature point set.

Specifically, in the example of the disclosure, after mounting the smart door lock, the user first inputs the fingerprint. In this case, the user needs to ensure that the finger is free of abnormality, for example, the finger does not molt, is not too dry or too wet, and is clean. In other words, the standard fingerprint image can be collected. In a fingerprint input process in the example of the disclosure, a feature point set of the standard fingerprint image can be obtained by extracting the feature from the standard fingerprint image of the finger of the user, and the feature point set is stored in the smart door lock.

In some optional embodiments, according to the example of the disclosure, when the user is going to open the door, a current fingerprint image to be matched of the user is acquired. A feature point set of the fingerprint image to be matched is obtained by extracting the feature. On this basis, a preset number of levels of Transformer matches is performed between the feature point set of the standard fingerprint image and the feature point set of the image to be matched. According to the example of the disclosure, three levels of Transformer matches are performed between the feature point set of the standard fingerprint image and the feature point set of the image to be matched. In other words, the Transformer match is performed three times, and a matching result is determined as a success or failure finally. In a case of the success, the smart door lock is opened, otherwise the smart door lock is not opened, which is merely illustrative and is not intended for limitation.

In some optional embodiments, if a plurality of standard fingerprint images are stored in the smart door lock according to the example of the disclosure, the Transformer match is performed between the feature point set of the collected fingerprint image to be matched and a feature point set corresponding to each standard fingerprint image until a matching result is determined. In other words, a match between the fingerprint image to be matched and one standard fingerprint image succeeds, or matches between the fingerprint image to be matched with all the standard fingerprint images fail.

In the method for matching a fingerprint image based on Transformer according to the example of the disclosure, the first feature point set of the fingerprint image to be matched is obtained by performing the Transformer feature extraction on the acquired fingerprint image to be matched. The matching result is generated by performing, based on the second feature point set of the standard fingerprint image, the preset number of levels of Transformer matches between the first feature point set and the second feature point set. According to the disclosure, the global information of the fingerprint can be captured by performing the fingerprint match by using a Transformer algorithm. Thus, an identification failure caused by an abnormality of partial fingerprint information is avoided, and accuracy of the fingerprint match is improved.

Figure 3:
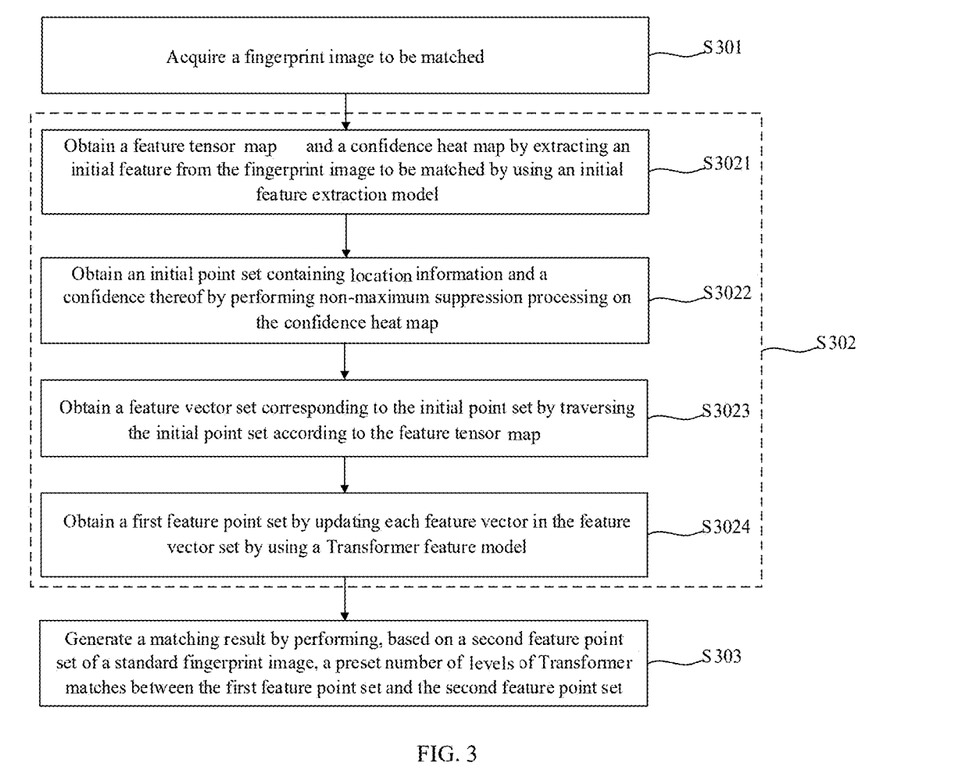
FIG. 3 is a schematic flowchart of another method for matching a fingerprint image based on Transformer according to an example of the disclosure.

A method for matching a fingerprint image based on Transformer according to the example may be used for the above mobile terminal such as the smart door lock. FIG. 3 is a flowchart of a method for matching a fingerprint image based on Transformer according to an example of the disclosure. As shown in FIG. 3, the flow includes:

S301, a fingerprint image to be matched is acquired. Reference can be made to S101 in the example shown in FIG. 1 for details, which will not be repeated herein.

S302, a first feature point set of the fingerprint image to be matched is obtained by performing Transformer feature extraction on the fingerprint image to be matched.

Specifically, the above S302 includes:

S3021, a feature tensor map and a confidence heat map are obtained by extracting an initial feature from the fingerprint image to be matched by using an initial feature extraction model.

Figure 4:
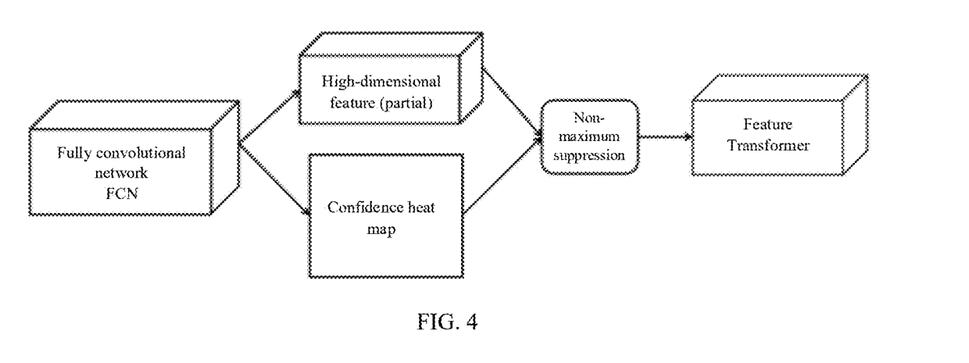
FIG. 4 is a schematic map of feature extraction of another method for matching a fingerprint image based on Transformer according to an example of the disclosure.

Specifically, in the example of the disclosure, the initial feature extraction model is pre-constructed based on fully convolutional networks (FCNs). The feature tensor map and the confidence heat map that have the same size are obtained by inputting the collected fingerprint image to be matched into the initial feature extraction model for processing. The feature tensor map represents a feature vector of each pixel in the fingerprint image to be matched, and the confidence heat map represents a confidence of each pixel in the fingerprint image to be matched. As shown in FIG. 4, in the example of the disclosure, a fingerprint image I to be matched and having a size of H*W is taken as an example, and a confidence heat map $S \in [0,1]^{H \times W}$ and a high-dimensional feature tensor map $X \in \mathbb{R}^{H \times W \times D}$ are output through the FCN. The confidence heat map represents confidence corresponding to each pixel in the image I, which is a type of comprehensive measure of a quality and a significance degree, and may be deemed as a probability of each pixel serving as a feature point. The high-dimensional feature tensor map represents a high-dimensional feature vector corresponding to each pixel in the image I, and D denotes a dimension of the feature vector.

S3022, an initial point set containing location information and the confidence thereof is obtained by performing non-maximum suppression processing on the confidence heat map.

Specifically, in the example of the disclosure, one initial point set containing the location information and the confidence thereof can be obtained after non-maximum suppression processing is performed on the confidence heat map S. A specific process is as follows: assuming that m denotes a number of feature points in the initial point set, $p_i(x_i, y_i)$ denotes a pixel coordinate vector of each feature point i in the confidence heat map, where i=1, 2, . . . , m. The confidence heat map S obtained and the fingerprint image I to be matched have the same size of H*W. Thus, $p_i$ denotes a pixel coordinate of the feature point i in the fingerprint image I to be matched, and $c_i$ denotes confidence obtained at a location $p_i(x_i, y_i)$ in the confidence heat map S.

S3023, a feature vector set corresponding to the initial point set is obtained by traversing the initial point set according to the feature tensor map.

Specifically, in the example of the disclosure, the high-dimensional feature tensor map X has the same size as the fingerprint image I to be matched and the confidence heat map S. Thus, a D-dimensional feature vector $d_i^* \in \mathbb{R}^D$ corresponding to each $p_i$ is extracted by traversing the location $p_i(x_i, y_i)$ in the high-dimensional feature tensor map X, so that a D-dimensional feature vector of each feature point in the initial point set can be obtained, which is collectively referred to as the feature vector set.

S3024, the first feature point set is obtained by updating each feature vector in the feature vector set by using a Transformer feature model, where the first feature point set includes the location information, the confidence thereof, and updated feature vectors of all feature points.

Specifically, in the example of the disclosure, the L levels of Transformer feature models are pre-constructed, and a feature vector $d_i^*$ of any feature point in the initial point set is taken as an input-layer node of the Transformer feature model. In other words, $$x_i^0 = d_i^*$$

In the formula, $x_i^0$ denotes the input-layer node of the feature point i in the Transformer feature model. Next, next-layer nodes are generated by iterating current-layer nodes by using a self-attention mechanism in the Transformer feature model. Assuming that $x_i^l$ denotes an l-layer node of the feature point i in the Transformer feature model, $$x_i^{l+1} = x_i^l + \text{MLP}([x_i^l \| m_i^l])$$

In the formula, MLP denotes a multilayer perceptron, [•‖•] denotes a vector splicing operation, and $m_i^l$ denotes an integrated information vector obtained by using the attention mechanism. A calculation formula of an information vector $m_i^l$ is as follows:

$$m_i^l = \sum_{j:(i,j)\in G} \alpha_{ij} v_j$$

In the formula, G denotes a complete bipartite graph with each $p_i$ as a vertex, j:(i, j)∈G denotes traversing of all connected sides with the feature point i as one vertex, and $\alpha_{ij}$ denotes an attention weight. In the example of the disclosure, $\alpha_{ij}$ is calculated by using a Softmax algorithm, and a calculation formula thereof is as follows:

$$\alpha_{ij} = \frac{\exp(q_i^T R(p_j - p_i) k_j / \sqrt{D})}{1 + \sum_j \exp(q_i^T R(p_j - p_i) k_j / \sqrt{D})}$$

$$\begin{bmatrix} q_i \\ k_i \\ v_i \end{bmatrix} = \begin{bmatrix} W_1 \\ W_2 \\ W_3 \end{bmatrix} + \begin{bmatrix} b_1 \\ b_2 \\ b_3 \end{bmatrix}$$

In the formula, $R(\bullet) \in \mathbb{R}^{D \times D}$ denotes a rotary embedding location, and $(q_i, k_i, v_i)$ denote three intermediate nodes (key, query, value) in the Transformer algorithm, which are obtained by performing three different linear projection transformation on $x_i^l$ respectively. A specific calculation process is the conventional technical means of the Transformer algorithm, and is not repeated herein.

In some optional embodiments, in the example of the disclosure, the output-layer node $x_i^L$ is taken as the updated feature vector corresponding to the feature point i. In other words, the feature vector $d_i^*$ is updated to $x_i^L$ ($d_i^* \to x_i^1 \to x_i^2 \to \ldots \to x_i^L$), and $x_i^L$ is taken as the feature vector $d_i$ of the feature point i, so as to obtain the feature point set:

$$P := \{(p_i(x_i, y_i), c_i, d_i) | i=1, 2, \ldots, m\}$$

In some optional embodiments, the feature point set P obtained in the example of the disclosure includes the location information $p_i(x_i, y_i)$, the confidence $c_i$, and the high-dimensional feature vector $d_i$ containing partial information and global context information of each feature point.

S303, a matching result is generated by performing, based on a second feature point set of a standard fingerprint image, a preset number of levels of Transformer matches between the first feature point set and the second feature point set. Reference can be made to S103 in the example shown in FIG. 1 for details, which will not be repeated herein.

In the method for matching a fingerprint image based on Transformer according to the example of the disclosure, the first feature point set of the fingerprint image to be matched is obtained by performing the Transformer feature extraction on the acquired fingerprint image to be matched. The matching result is generated by performing, based on the second feature point set of the standard fingerprint image, the preset number of levels of Transformer matches between the first feature point set and the second feature point set. According to the disclosure, global information of a fingerprint can be captured by performing a fingerprint match by using a Transformer algorithm. Thus, an identification failure caused by an abnormality of partial fingerprint information is avoided, and accuracy of the fingerprint match is improved.

Figure 5:
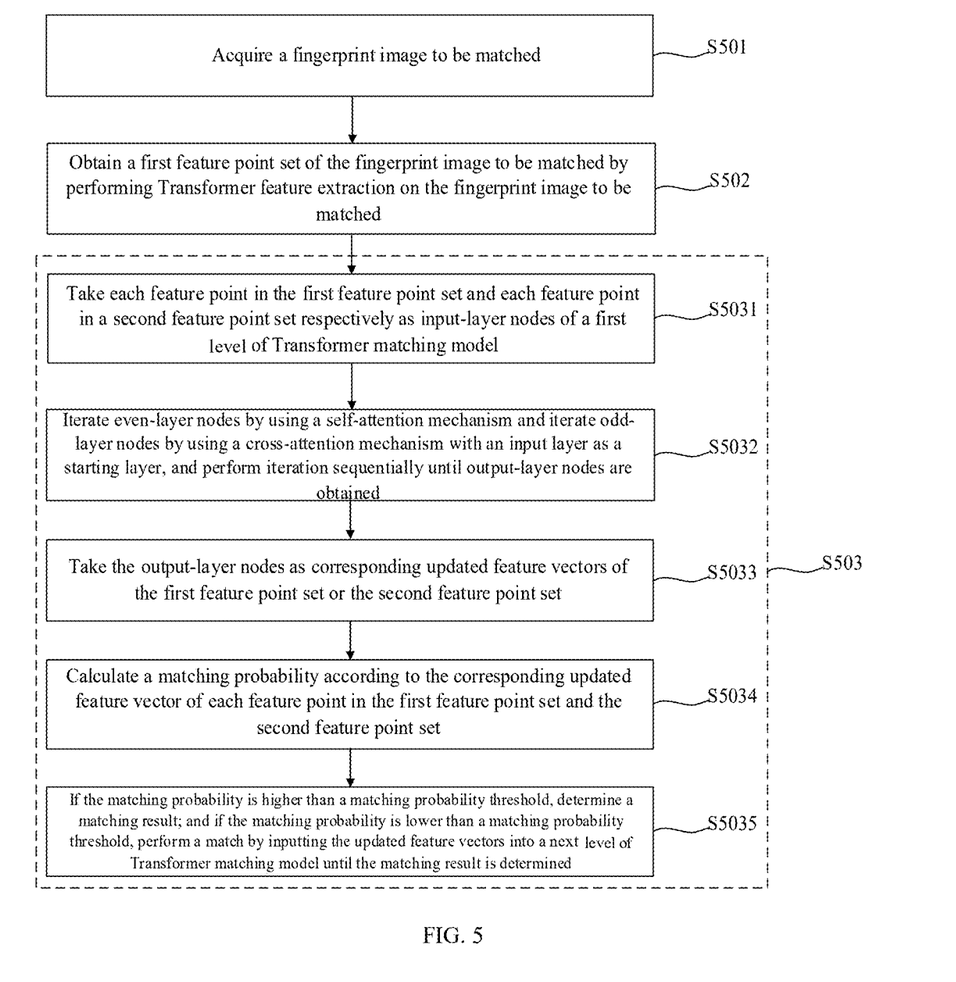
FIG. 5 is a schematic flowchart of yet another method for matching a fingerprint image based on Transformer according to an example of the disclosure.

A method for matching a fingerprint image based on Transformer according to the example may be used for the above mobile terminal such as the smart door lock. FIG. 5 is a flowchart of a method for matching a fingerprint image based on Transformer according to an example of the disclosure. As shown in FIG. 5, the flow includes: S501, a fingerprint image to be matched is acquired. Reference can be made to S301 in the example shown in FIG. 3 for details, which will not be repeated herein.

S502, a first feature point set of the fingerprint image to be matched is obtained by performing Transformer feature extraction on the fingerprint image to be matched. Reference can be made to S302 in the example shown in FIG. 3 for details, which will not be repeated herein.

S503, a matching result is generated by performing, based on a second feature point set of a standard fingerprint image, a preset number of levels of Transformer matches between the first feature point set and the second feature point set.

Specifically, the above S503 includes: Step S5031, each feature point in the first feature point set and each feature point in the second feature point set are respectively taken as input-layer nodes of a first level of Transformer matching model.

Figure 6:
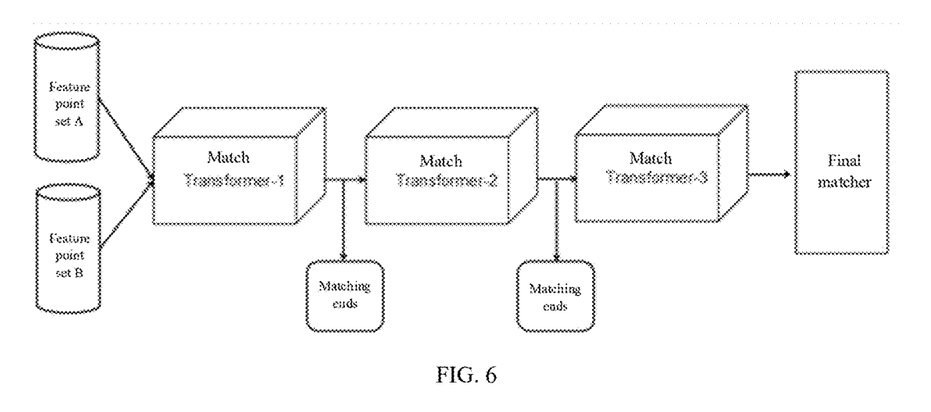
FIG. 6 is a schematic map of a Transformer matching process of yet another method for matching a fingerprint image based on Transformer according to an example of the disclosure.

Specifically, in the example of the disclosure, a plurality of levels of Transformer matching models are pre-constructed, and each level of Transformer matching model has different number of layers. As shown in FIG. 6, in the example of the disclosure, three levels of Transformer matching models are pre-constructed, where $L_1$, $L_2$, and $L_3$ denote the levels sequentially, which is merely illustrative and is not intended for limitation.

In some optional embodiments, each level of Transformer matching model in the example of the disclosure has basically the same structure, but a different number of layers, and thus has a same matching processing procedure. In the example of the disclosure, a processing procedure of a first level of Transformer matching model is taken as an example, where $P^A:=\{(p_i^A(x_i^A, y_i^A), c_i^A, d_i^A)|i=1, 2, \ldots, m\}$ denotes a feature point set of the acquired fingerprint image to be matched, $P^B:=\{(p_i^B(x_i^B, y_i^B), c_i^B, d_i^B)|i=1, 2, \ldots, n\}$ denotes the feature point set of the standard fingerprint image, I={A,B}, and two feature point sets are taken respectively as input-layer nodes of the first level of Transformer matching model, i.e. $Ix_i^0 = d_i^I$.

S5032, even-layer nodes are iterated by using the self-attention mechanism and odd-layer nodes are iterated by using the cross-attention mechanism with an input layer as a starting layer, and iteration is performed sequentially until output-layer nodes are obtained.

Specifically, in the example of the disclosure, different from the Transformer feature model, the Transformer matching model needs to treat two feature point sets differently. In other words, $Ax_i^l$ denotes an i-layer node of the feature point i in $P^A$, and $Bx_i^l$ denotes an i-layer node of the feature point i in $P^B$, so that an update formula for the nodes in the Transformer matching model is as follows:

$$Ix_i^{l+1} = Ix_i^l + \text{MLP}([Ix_i^l \| Im_i^l])$$

In some alternative embodiments, in the example of the disclosure, the attention mechanism is divided into the self-attention mechanism and the cross-attention mechanism in the Transformer matching model, where an even layer employs the self-attention mechanism, and an odd layer employs the cross-attention mechanism. Formally, in a case of the self-attention mechanism, S=I, and in a case of the cross-attention mechanism, S={A, B}\I ("\" denotes the difference set operation), so that a calculation formula of $Im_i^l$ is as follows:

$$Im_i^l = \sum_{i \in I, j \in S} \alpha_{ij} v_j$$

In some alternative embodiments, in a case of the self-attention mechanism, S=I, and a calculation formula of $\alpha_{ij}$ is the same as that in the Transformer feature model as follows:

$$\alpha_{ij} = \frac{\exp(q_i^T R(p_j - p_i)k_j/\sqrt{D})}{1 + \sum_j \exp(q_i^T R(p_j - p_i)k_j/\sqrt{D})}$$

In some optional embodiments, in a case of the cross-attention mechanism, S={A, B}\I, in this case, the relative location deviation $p_j - p_i$ is meaningless. Thus, in the example of the disclosure, rotary location embedding is deleted herein, and a weight $\alpha_{ij}$ is calculated through a key value only. In this way, a calculation amount can be basically saved on, calculation performance can be ensured. A calculation formula thereof is as follows:

$$\alpha_{ij} = \frac{\exp(k_i^T k_j/\sqrt{D})}{1 + \sum_j \exp(k_i^T k_j/\sqrt{D})}$$

$$\begin{bmatrix} k_i \\ v_i \end{bmatrix} = \begin{bmatrix} W_1 \\ W_2 \end{bmatrix} x_i^l + \begin{bmatrix} b_1 \\ b_2 \end{bmatrix}$$

S5033, the output-layer nodes are taken as the corresponding updated feature vectors of the first feature point set or the second feature point set.

Specifically, in the example of the disclosure, after the first level of Transformer matching mode, the feature point i in I is iteratively updated to $Ix_i^{L_1}$ ($d_i^l \to Ix_i^1 \to Ix_i^2 \ldots \to Ix_i^{L_1}$) from the feature vector $d_i^l$. In this case, compared with $d_i^l$, $Ix_i^{L_1}$ includes information of the fingerprint image to be matched, implies information of the standard fingerprint image matched with the fingerprint image to be matched, and thus is more suitable for the matching measure and analysis.

S5034, a matching probability is calculated according to the corresponding updated feature vector of each feature point in the first feature point set and the second feature point set.

Specifically, the above S5034 includes:

Step a1, a matching confidence for each feature point in the first feature point set or the second feature point set is calculated according to the corresponding updated feature vector.

Step a2, indicative function calculation is performed on the matching confidence according to a highest probability threshold and a lowest probability threshold.

Step a3, a matching success probability and a matching failure probability are calculated according to an indicative function calculation result corresponding to the first feature point set and an indicative function calculation result corresponding to the second feature point set.

Specifically, in the example of the disclosure, after linear transformation with an offset is performed on $Ix_i^{L_1}$, a matching confidence $\sigma_i^l$ of the feature point set I is obtained by performing Sigmoid function calculation. A probability of whether the feature point i in I has a matching corresponding point in the Transformer match is measured through the matching confidence $\sigma_i^l$, and a calculation formula thereof is as follows:

$$\sigma_i^I = \frac{1}{1 + e^{w^T * Ix_i^{L_1} + b}}$$

In the formula, I∈ {A, B}, A denotes the first feature point set, B denotes the second feature point set, $Ix_i$ denotes is the feature vector of the feature point i in A or B, $w^T$ denotes a linear transformation matrix, and b denotes the offset of the linear transformation matrix.

In some alternative embodiments, in the example of the disclosure, the indicative function calculation is performed on the matching confidence according to the highest probability threshold and the lowest probability threshold. The indicative function, a type of special function, is configured to indicate whether an event E occurs. If yes, it is defined as 1, and if no, it is defined as 0. A calculation formula thereof is as follows:

$$\chi(E) = \begin{cases} 1, & E \text{ is true} \\ 0, & E \text{ is false} \end{cases}$$

In some optional embodiments, in the example of the disclosure, the highest probability threshold $C_H$ is set to 0.95, and the lowest probability threshold $C_L$ is set to 0.05. When $\sigma_i^I$ is greater than $C_H$, it denotes that the probability that the feature point has a matching corresponding point is very high. When $\sigma_i^I$ is smaller than $C_L$, it indicates that the probability that the feature point has a matching corresponding point is very low. A calculation formula according to the indicative function is as follows:

$$\chi(\sigma_i^I > C_H) = \begin{cases} 1, & \sigma_i^I > C_H \text{ is true} \\ 0, & \sigma_i^I > C_H \text{ is false} \end{cases}$$

$$\chi(\sigma_i^I > C_L) = \begin{cases} 1, & \sigma_i^I > C_L \text{ is true} \\ 0, & \sigma_i^I > C_L \text{ is false} \end{cases}$$

In some optional embodiments, the case that $\sigma_i^I$ is greater than $C_H$ and the case that $\sigma_i^I$ is smaller than $C_L$ are deemed as being able to determine the matching result, i.e. being able to directly determine whether a match with the feature point succeeds or fails in the disclosure. Thus, in the example of the disclosure, the matching success probability is calculated according to the feature point, the match of which succeeds, and the matching failure probability is calculated according to the feature point, the match of which fails. A calculation formula thereof is as follows:

$$R_H = \frac{\sum_{i=1}^{m} \chi(\sigma_i^A > C_H) + \sum_{i=1}^{n} \chi(\sigma_i^B > C_H)}{m+n} \in [0, 1]$$

$$R_L = \frac{\sum_{i=1}^{m} \chi(\sigma_i^A < C_L) + \sum_{i=1}^{n} \chi(\sigma_i^B < C_L)}{m+n} \in [0, 1]$$

In the formula, $R_H$ denotes the matching success probability, $R_L$ denotes the matching failure probability, m denotes a number of the feature points in the first feature point set, and n denotes a number of the feature points in the second feature point set.

S5035, if the matching probability is higher than a matching probability threshold, the matching result is determined; and if the matching probability is lower than a matching probability threshold, a match is performed by inputting the updated feature vectors into a next level of Transformer matching model until the matching result is determined.

Specifically, in the example of the disclosure, a final matching result is determined according to the matching success probability and the matching failure probability; if the matching success probability $R_H$ is higher than the matching success probability threshold $\alpha_H$, the matching result is determined to be a matching success; and if the matching failure probability $R_L$ is higher than the matching failure probability threshold $\alpha_L$, the matching result can be directly pre-determined to be a matching failure.

In some optional embodiments, if the matching success probability $R_H$ obtained by using the first level of Transformer matching model is not higher than the matching success probability threshold $\alpha_H$, or the matching failure probability $R_L$ is not higher than the matching failure probability threshold $\alpha_L$, it is proved that the matching result is uncertain in this case, the updated feature vector $Ix_i^{L_1}$ obtained by using the first level of Transformer matching model is taken as an input-layer node of a second level of Transformer matching model, and the feature vector $Ix_i^{L_1}$ is updated to a feature vector $Ix_i^{L_2}$ through iteration of $L_2$. Then, a matching probability is calculated based on the feature vector $Ix_i^{L_2}$. If the matching result still cannot be pre-determined, an updated $Ix_i^{L_3}$ is obtained by continuing to update the feature vector $Ix_i^{L_2}$ in a third level of Transformer matching model. It can be seen that in the example of the disclosure, the matching probability is calculated after each level of Transformer match until a final level of Transformer matching model is reached.

In some optional embodiments, the three levels of Transformer matching models are set in the example of the disclosure, if no matching result is determined before the third level of Transformer match is performed, after the third level of Transformer matching model is entered, a final match is performed according to a feature vector $Ix_i^{L_3}$ and a matching confidence $\sigma_i^I$ that are calculated at the level. A process thereof is as follows: first, a matchable feature $f_i^I$ is obtained by performing linear projection transformation on an updated feature vector $Ix_i^{L_3}$ that is output by the third level of Transformer matching model. A transformation formula is as follows:

$$f_i^I = W_f * Ix_i^{L_3} + b_f \in \mathbb{R}^D$$

Then, matching degrees $Z_{ij}*$ between the feature points in the first feature point set $P^A$ and the feature points in the second feature point set $P^B$ are calculated according to the matchable feature $f_i^I$. A calculation formula thereof is as follows:

$$Z_{ij}^* = \sigma_i^A \sigma_j^B \langle f_i^A, f_j^B \rangle$$

In the formula, $\langle f_i^A, f_i^A \rangle$ denotes an inner product of $f_i^A$ and $f_i^B$.

Finally, a score matrix is obtained by normalizing the matching degrees, and the matching result is determined by performing consistency matching calculation by using a preset matching algorithm. The preset matching algorithms employed in the example of the disclosure includes a greedy algorithm, a Hungarian algorithm, a maximum flow algorithm, etc., which are merely illustrative and are not intended for limitation. The confidence $c_i$ in the feature point set is used in a process of determining the final matching result by using various matching algorithms, and the specific calculation process is the conventional technical means in the art, and is not repeated herein.

In some optional embodiments, in the example of the disclosure, a deep network framework involved throughout the fingerprint image match is pre-trained based on a transformation relation F between two real matched images having a known matching result. The transformation relation may be rigid transformation or affine transformation, but which is not intended for limitation. A training process includes: machine-learning and training the Transformer matching model, machine-learning and training a confidence heat map extraction sub-process in the Transformer feature extraction process, and machine-learning and training as well as jointly machine-learning and training the feature tensor map extraction in the Transformer feature extraction process.

In some optional embodiments, a machine-learning and training process of the Transformer matching model in the example of the disclosure is as follows: a real corresponding relation between $P^A$ and $P^B$ can be determined according to the transformation relation F between the two real matched images having the known matching result; and $\mathcal{M}$ denotes a point pair truly matched with each other, $U^A$ denotes a point not matched in $P^A$, and $U^B$ denotes a point not matched in $P^B$, so that a loss function for a matching level is constructed as follows:

$$\mathcal{L}_{Match} = 1 - \frac{1}{3}\left(\frac{1}{|\mathcal{M}|}\right)\sum_{(i,j)\in \mathcal{M}} Z_{ij} +$$
$$\frac{1}{3|U^A|}\sum_{i\in U^A}(1-\sigma_i^A) + \frac{1}{3|U^B|}\sum_{i\in U^B}(1-\sigma_i^B))$$

In the formula, |•| denotes a number of elements in the set, $\sigma_i^A$ and $\sigma_i^B$ are calculated from the 3 models, and thus $|U^A|$ and $|U^B|$ are multiplied by a multiple 3. However, the calculation result of each Transformer matching model varies. In order to simplify the formulation in the example of the disclosure, on the basis of not affecting the expression of the true meaning, no subscript for differentiation is added to $\sigma_i^I$ of each Transformer matching model.

In some optional embodiments, the machine-learning and training process of the confidence heat map extraction sub-process in the Transformer feature extraction process in the example of the disclosure is as follows: since two fingerprint images to be matched have certain similarity in the matching region of the confidence heat map S, $S^A$ and $S^B$ denote confidence heat maps obtained from original fingerprint images A and B of $P^A$ and $P^B$ respectively, and $S_F^B$ denotes the confidence heat map locationed in the corresponding region and obtained after F transformation on $S^B$. Moreover, two real fingerprint images to be matched can have a similar confidence at corresponding locations. In the example of the disclosure, the similar confidence is constrained through a cosine similarity CosSim, O denotes a pixel set of A and B in an overlapping region, and the cosine similarity loss function of the confidence heat map S is as follows:

$$\mathcal{L}_{cosim}(A,B,F)=1-\mathrm{CosSim}(S^A[O],S_F^B[O])$$

In the formula, $S^A[O]$ and $S_F^B[O] \in \mathbb{R}^{|O|}$ denote vectors formed by values extracted from the overlapping region of the confidence heat map S. CosSim denotes a cosine similarity function of two vectors, i.e.

$$\mathrm{CosSim}(u,v) = 1 - \left|\frac{<u,v>}{\|u\|\cdot\|v\|}\right|$$

Since the confidence heat map in which the corresponding locations are similar is satisfied when all pixels in the fingerprint image are feature points or all pixels are not feature points, the constant $S^A$ and $S^B$ can easily satisfy the $\mathcal{L}_{cosim}$ constraint, and the solution of the formula has no significance in this case. Thus, in the disclosure, a difference between a partial maximum and a partial mean is taken as a significance degree of a partial region, and when the value is greater, the point is more significant as the feature. For each pixel p in the overlapping region O, $\mathcal{N}(p)$ denotes a rectangular region centered on p and with a fixed threshold r as its radius. The sparsity loss function of the confidence heat map S is as follows:

$$\mathcal{L}_{peaky}(I) = 1 - \frac{1}{|O|}\sum_{p\in O}\left(\max_{t\in \mathcal{N}(p)} S^I[t] - \underset{t\in \mathcal{N}(p)}{\mathrm{mean}}\, S^I[t]\right)$$

In the above formula, the greater the r is, the greater the sparsity is. If r equals 0, it denotes that there is no requirement for sparsity. By selecting an appropriate r, the feature point set obtained through final optimization solution can satisfy the desired sparsity requirement. In the example of the disclosure, r is set to 11, but which is not intended for limitation.

In the example of the disclosure, the final loss function of the confidence heat map S is formed by performing a weighted combination on the cosine similarity loss function of the confidence heat map S and the sparsity loss function. The final loss function is as follows:

$$\mathcal{L}_S(A,B,F)= \mathcal{L}_{cosim}(A,B,F)+\lambda_p(\mathcal{L}_{peaky}(A)+\mathcal{L}_{peaky}(B))$$

A weight $\lambda_p$ is obtained through actual debugging according to a training result, and is determined as 1.67 in the example of the disclosure, but which is not intended for limitation. In the example of the disclosure, the extraction process of the confidence heat map is trained based on the final loss function, and training is completed when the loss function no longer decreases.

In some optional embodiments, in the example of the disclosure, the machine-learning and training process of feature tensor map extraction in the Transformer feature extraction process is actually joint machine-learning of a processing procedure of the high-dimensional feature tensor map X and the confidence heat map S. The supervised machine-learning gradient of the high-dimensional feature tensor map X is mainly sourced from the machine-learning gradient returned by the $d_i^*$ of the Transformer feature model at the feature point location. Since machine-learning efficiency of the high-dimensional feature tensor map X is very low due to the sparse feature points, machine-learning of the high-dimensional feature tensor map is promoted by introducing more supervised machine-learning mechanisms in the example of the disclosure. Specifically, $X^A$ and $X^B$ denote the obtained high-dimensional feature tensor maps of A and B. For each pixel p in the overlapping region O of A and B, $p^A$ is set to indicate its location in A, and $p^B$ is set to indicate its location in B, i.e. $p^A=F(p^B)$. The corresponding locations have a certain similarity. In other words, the high-dimensional feature vectors $X^A[p^A]$ and $X^B[p^B]$ are sufficiently close to each other in a distance measure. The distance measure may be a Euclidean distance or a cosine distance, but which is not intended for limitation. However, if only the distance constraint is applied to the corresponding locations, similar to the condition ennumberered in the above confidence heat map, a trivial solution is obtained, and in other words, the high-dimensional feature vectors are the same at all locations. Thus, feature differences are introduced in the example of the disclosure for machine-learning, and thus rational and differential high-dimensional features are obtained.

Further, for each pixel p in the overlapping region O of A and B, the high-dimensional feature vectors $X^A[p^A]$ and $X^B[p^B]$ may obtain a positive sample:

$$\text{Positive}(A,B,O,p)=\|X^A[p^A]-X^B[p^B]\|_2$$

A point that is most similar to $X^A[p^A]$ but should not be matched is selected from $X^B$ as a negative sample, i.e.

$$n_1 = \arg\min_{t \in B} \|X^A[p^A] - X^B[t]\|_2 \text{ s.t. } \|t - p^B\|_\infty > K$$

In the formula, K denotes a radius threshold. The greater the value is, the simpler the negative sample is, and the smaller the value is, the harder the negative sample is. In the example of the disclosure, K is set to 5, but which is not intended for limitation. The negative sample $X^B[n_1]$ of $X^A[p^A]$ can be obtained by solving the above formula. Similarly, the negative sample $X^A[n_2]$ of $X^B[p^B]$ can be obtained, and then the negative sample of p can be obtained as follows:

$$\text{Negative}(A,B,O,p)=\min(\|X^A[p^A]-X^B[n_1]\|_2,\|X^B[p^B]-X^A[n_2]\|_2)$$

For each pixel p, a machine-learning target is to make its positive sample as small as possible, and in other words, the high-dimensional feature vectors at the corresponding location points are as similar as possible; and make its negative sample as large as possible, and in other words, the high-dimensional feature vectors at the incorrect corresponding locations are as differential as possible. In the example of the disclosure, the machine-learning target is expressed by using a metric function, and a metric function formula is as follows:

$$m(A,B,O,p)=\max(0,\text{Margin}+\text{Positive}(A,B,O,p)^2-\text{Negative}(A,B,O,p)^2)$$

A threshold Margin denotes a "certain difference". If Margin equals 0, it indicates that the high-dimensional feature vectors at the incorrect corresponding locations only need to have a difference. The greater the Margin is, the bigger the difference required is, and the more difficult the training and machine-learning are. In the example of the disclosure, Margin is set to 2, but which is not intended for limitation.

For each pixel p in the overlapping region O of A and B, the machine-learning targets of m(A, B, O, p) are summarized and added with the value of the corresponding confidence heat map $S^I$, so as to obtain the joint machine-learning loss function of the final high-dimensional feature tensor map X and the confidence heat map S:

$$\mathcal{L}_X(A, B, F) = \sum_{p \in O} S^A[p] S^B_F[p] m(A, B, O, p)$$

The loss function for the final feature extraction level is as follows:

$$\mathcal{L}_{Feature}=\mathcal{L}_s(A,B,F)+\lambda_d \mathcal{L}_x(A,B,F)$$

The weight $\lambda_d$ is obtained through actual debugging according to a result of a training test, and is determined as 0.45 in the example of the disclosure, but which not intended for limitation.

In some optional embodiments, after the individual training at each level is completed, comprehensive joint training is also performed in the disclosure. In other words, unified training is performed on the model based on the weighted combination of the loss function at each feature extraction and matching level, and the comprehensive loss function is as follows:

$$\mathcal{L}_{Final}=\mathcal{L}_{Match}+\lambda_F \mathcal{L}_{Feature}$$

$$\mathcal{L}_{Final}=\mathcal{L}_{Match}+\lambda_F(\mathcal{L}_s(A,B,F)+\lambda_d \mathcal{L}_x(A,B,F))$$

$$\mathcal{L}_{Final}=\mathcal{L}_{Match}+\lambda_F(\mathcal{L}_{cosim}(A,B,F)+\lambda_p(\mathcal{L}_{peaky}(A)+\mathcal{L}_{peaky}(B))+\lambda_d \mathcal{L}_x(A,B,F))$$

In the formula, $\lambda_F$, $\lambda_p$, and $\lambda_d$ are hyperparameter weights that control the entire feature extraction level, the sparsity of the confidence heat map S, and a machine-learning degree of the high-dimensional feature tensor map respectively. When the weight is greater, machine-learning at the corresponding level draws more attention. The weight $\lambda_F$ in the example of the disclosure is also obtained through actual debugging according to the result of the training test, and is determined as 1.33, but which is not intended for limitation.

According to the disclosure, a fingerprint matching depth network framework based on the Transformer algorithm is constructed by introducing the Transformer algorithm. Thus, the global information of the fingerprint can be captured, an identification failure caused by an abnormality of partial fingerprint information can be avoided, and accuracy of the fingerprint match can be improved.

An apparatus for matching a fingerprint image based on Transformer is further provided in the example. The apparatus is configured to implement the above example and the preferred embodiment. What have already been described will not be repeated herein. As used below, the term "module" can be a combination of software and/or hardware that implements predetermined functions. While the apparatus described in the following example is preferably implemented through software, it is possible to conceivable that the apparatus is implemented through hardware, or a combination of the software and the hardware.

Figure 7:
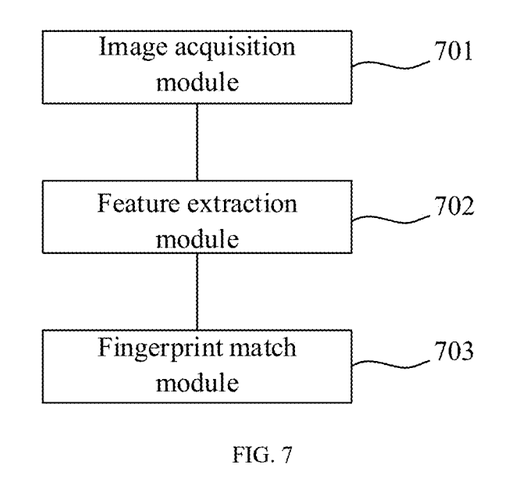
FIG. 7 is a structural block map of an apparatus for matching a fingerprint image based on Transformer according to an example of the disclosure.

The apparatus for matching a fingerprint image based on Transformer is provided in the example. As shown in FIG. 7, the apparatus includes:

an image acquisition module 701 configured to acquire a fingerprint image to be matched;

a feature extraction module 702 configured to obtain a first feature point set of the fingerprint image to be matched by performing Transformer feature extraction on the fingerprint image to be matched; and a fingerprint match module 703 configured to generate a matching result by performing, based on a second feature point set of a standard fingerprint image, a preset number of levels of Transformer matches between the first feature point set and the second feature point set.

In some optional embodiments, the feature extraction module 702 includes:

an initial feature extraction unit configured to obtain a feature tensor map and a confidence heat map by extracting an initial feature from the fingerprint image to be matched by using an initial feature extraction model, where the feature tensor map represents a feature vector of each pixel in the fingerprint image to be matched, and the confidence heat map represents a confidence of each pixel in the fingerprint image to be matched;

an initial point set acquisition unit configured to obtain an initial point set containing location information and the confidence thereof by performing non-maximum suppression processing on the confidence heat map;

a feature vector acquisition unit configured to obtain a feature vector set corresponding to the initial point set by traversing the initial point set according to the feature tensor map; and a Transformer feature extraction unit configured to obtain the first feature point set by updating each feature vector in the feature vector set by using a Transformer feature model, where the first feature point set includes the location information, the confidence thereof, and updated feature vectors of all feature points.

In some optional embodiments, the Transformer feature extraction unit includes:

an input sub-unit configured to take each feature vector in the feature vector set as an input-layer node of the Transformer feature model sequentially, where the Transformer feature model has a preset number of layers;

an iteration sub-unit configured to generate next-layer nodes by iterating current-layer nodes by using a self-attention mechanism with an input layer as a starting layer, and perform iteration sequentially until output-layer nodes are obtained; and an update sub-unit configured to take the output-layer nodes as the updated feature vectors corresponding to the feature points.

In some optional embodiments, the fingerprint match module 703 includes:

an input unit configured to take each feature point in the first feature point set and each feature point in the second feature point set respectively as input-layer nodes of a first level of Transformer matching model;

an iteration unit configured to iterate even-layer nodes by using the self-attention mechanism and iterate odd-layer nodes by using a cross-attention mechanism with an input layer as a starting layer, and perform iteration sequentially until output-layer nodes are obtained;

an update unit configured to take the output-layer nodes as the corresponding updated feature vectors of the first feature point set or the second feature point set; and a matching probability calculation unit configured to determine the matching result if a matching probability is higher than a matching probability threshold; and perform a match by inputting the updated feature vector into a next level of Transformer matching model until the matching result is determined if a matching probability is lower than a matching probability threshold.

In some optional embodiments, the matching probability calculation unit includes:

a matching confidence degree calculation sub-unit configured to calculate a matching confidence for each feature point in the first feature point set or the second feature point set according to the corresponding updated feature vector, where a calculation formula thereof is as follows:

$$\sigma_i^I = \frac{1}{1 + e^{w^T * Ix_i + b}}$$

In the formula, $I \in \{A, B\}$ A denotes the first feature point set, B denotes the second feature point set, $Ix_i$ denotes is a feature vector of a feature point i in A or B, $w^T$ denotes a linear transformation matrix, and b denotes an offset of the linear transformation matrix;

an indicative function calculation sub-unit configured to perform indicative function calculation on the matching confidence according to a highest probability threshold and a lowest probability threshold, where a calculation formula thereof is as follows:

$$\chi(\sigma_i^I > C_H) = \begin{cases} 1, & \sigma_i^I > C_H \text{ is true} \\ 0, & \sigma_i^I > C_H \text{ is false} \end{cases}$$

$$\chi(\sigma_i^I < C_L) = \begin{cases} 1, & \sigma_i^I > C_L \text{ is true} \\ 0, & \sigma_i^I > C_L \text{ is false} \end{cases}$$

In the formula, $C_H$ denotes the highest probability threshold, and $C_L$ denotes the lowest probability threshold;

a matching probability calculation sub-unit configured to calculate a matching success probability and a matching failure probability according to an indicative function calculation result corresponding to the first feature point set and an indicative function calculation result corresponding to the second feature point set, where a calculation formula thereof is as follows:

$$R_H = \frac{\sum_{i=1}^{m} \chi(\sigma_i^A > C_H) + \sum_{i=1}^{n} \chi(\sigma_i^B > C_H)}{m+n} \in [0, 1]$$

$$R_L = \frac{\sum_{i=1}^{m} \chi(\sigma_i^A < C_L) + \sum_{i=1}^{n} \chi(\sigma_i^B < C_L)}{m+n} \in [0, 1]$$

In the formula, $R_H$ denotes the matching success probability, $R_L$ denotes the matching failure probability, m denotes a number of the feature points in the first feature point set, and n denotes a number of the feature points in the second feature point set; and a matching result determination sub-unit configured to determine the matching result to be a matching success if the matching success probability is higher than a matching success probability threshold; and determine the matching result to be a matching failure if the matching failure probability is higher than a matching failure probability threshold.

In some optional embodiments, the fingerprint match module 703 further includes:

a final match unit configured to obtain a matchable feature by performing linear projection transformation on an updated feature vector output by a final level of Transformer matching model; calculate matching degrees between the feature points in the first feature point set and the feature points in the second feature point set according to the matchable feature; and obtain a score matrix by normalizing the matching degrees, and determine the matching result by performing consistency matching calculation by using a preset matching algorithm.

In some possible embodiments, the apparatus further includes:

a model training module configured to acquire a transformation relation between two real matched images having a known matching result; machine-learn and train a Transformer matching process according to the transformation relation based on a matching loss function; machine-learn and train a confidence heat map extraction sub-process in a Transformer feature extraction process according to the transformation relation based on a confidence heat map loss function formed by a weighted combination of a cosine similarity loss function of the confidence heat map and a sparsity loss function of the confidence heat map; machine-learn and train the Transformer feature extraction process according to the transformation relation based on a feature extraction loss function formed by a weighted combination of the confidence heat map loss function and a joint loss function of the feature tensor map and the confidence heat map; and jointly machine-learn and train the Transformer matching process and the Transformer feature extraction process based on a comprehensive loss function formed by a weighted combination of the matching loss function and the feature extraction loss function.

Further functional descriptions of the above modules and units are the same as those in the above corresponding examples, and are not repeated herein.

The apparatus for matching a fingerprint image based on Transformer in the example is presented in the form of functional units. The units herein indicate application specific integrated circuits (ASICs), processors and memories that execute one or more software or fixed programs, and/or other devices that can provide the above functions.

A computer device is further provided in the examples of the disclosure. The computer device is provided with the apparatus for matching a fingerprint image based on Transformer shown in FIG. 7.

Figure 8:
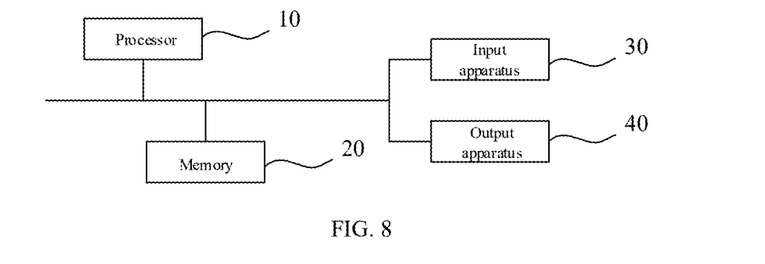
FIG. 8 is a schematic structural map of hardware of a computer device according to an example of the disclosure.

With reference to FIG. 8, FIG. 8 is a schematic structural map of a computer device according to an optional example of the disclosure. As shown in FIG. 8, the computer device includes: one or more processors 10, a memory 20, and interfaces configured to be connected to all components and including a high-speed interface and a low-speed interface. All the components are in intercommunication connection with one another through different buses, and may be mounted on a common motherboard or in other manners as required. The processor may process instructions executed in the computer device, including instructions stored in or on the memory to display graphical information of a graphical user interface (GUI) on an external input/output apparatus (such as a display device coupled to the interface). In some optional embodiments, a plurality of processors and/or buses may be used along with a plurality of memories as required. Similarity, a plurality of computer devices may be connected, and each device provides some necessary operations (for example, as a server array, a blade server set, or a multiprocessor system). One processor 10 is illustrated in FIG. 8.

The processor 10 may be a central processing unit, a network processor, or their combination. The processor 10 may further include a hardware chip. The above hardware chip may be an application specific integrated circuit, a programmable logic device, or their combination. The above programmable logic device may be a complex programmable logic device, a field programmable logic gate array, universal array logic, or their any combinations.

The memory 20 stores instructions executable by at least one processor 10 to cause the at least one processor 10 to perform the method in the above example.

The memory 20 may include a program storage area and a data storage area. The program storage area may store an operation system and an application required by at least one function. The data storage area may store data constructed according to the use by a computer device, etc. In addition, the memory 20 may include a high-speed random access memory, and a non-transitory memory, such as at least one magnetic disk storage device, a flash memory device, or other non-transitory solid-state storage devices. In some optional embodiments, the memory 20 may optionally include memories remotely configured relative to the processor 10. These remote memories may be connected to the computer device through a network. Instances of the above network include, but are not limited to, the Internet, an intranet, a local area network, a mobile communication network, and their combinations.

The memory 20 may include a volatile memory, such as a random access memory. The memory may further include a non-volatile memory, such as a flash memory, a hard disk, and a solid state disk. The memory 20 may further include combinations of the above types of memories.

The computer device further includes an input apparatus 30 and an output apparatus 40. The processor 10, the memory 20, the input apparatus 30, and the output apparatus 40 may be connected through a bus, etc. In FIG. 8, they are connected through a bus as an example.

The input apparatus 30 may receive input digital or character information and generate key signal input relevant to user settings and function control of the computer device. The input apparatus may be a touch screen, a keypad, a mouse, a track pad, a touch pad, a pointing stick, one or more mouse buttons, a track ball, a joystick, etc. The output apparatus 40 may include a display device, an auxiliary lighting device (for example, a light emitting diode (LED)), a tactile feedback apparatus (for example, a vibration motor), etc. The above display device may include, but is not limited to, a liquid crystal display, an LED display, and a plasma display. In some optional embodiments, the display device may be a touch screen.

A computer-readable storage medium is further provided in the examples of the disclosure. The above methods according to the examples of the disclosure may be implemented in hardware or firmware, implemented as computer codes recordable on a storage medium, or implemented as computer codes originally stored in a remote storage medium or a non-transitory machine-readable storage medium, downloaded through a network, and to be stored in a local storage medium. Thus, the methods described herein may be processed by such software stored in a storage medium of a general-purpose computer, a special-purpose processor, or programmable or special-purpose hardware. The storage medium may be a magnetic disk, an optical disk, a read-only memory, a random access memory, a flash memory, a hard disk, a solid state disk, etc. Further, the storage medium may further include a combination of the above types of memories. It can be understood that the computer, processor, microprocessor controller, or programmable hardware includes a storage component that can store or receive software or computer codes that, when accessed and executed by the computer, processor, or hardware, implement the methods shown in the above examples.

Portions of the disclosure may be applied as computer program products, such as computer program instructions that, when executed by a computer, may invoke or provide the methods and/or the technical solutions of the disclosure by means of operations of the computer. Those skilled in the art should understand that the existence form of the computer program instructions in the computer-readable medium includes, but is not limited to, a source file, an executable file, an installation package file, etc. Accordingly, the manner in which the computer program instructions are executed by a computer includes, but is not limited to, the computer directly executes the instructions; the computer compiles the instructions, and then executes corresponding compiled programs; the computer reads and executes the instructions; and alternatively, the computer reads and installs the instructions, and then executes corresponding installed programs. The computer-readable medium herein may be any available computer-readable storage medium or communication medium that can be accessed by a computer.

A smart door lock is further provided in the examples of the disclosure. The smart door lock includes the above computer device shown in FIG. 8.

Although the examples of the disclosure have been described in conjunction with the accompanying drawings, those skilled in the art can make various modifications and variations without departing from the spirit and scope of the disclosure, and such modifications and variations fall within the scope defined by the appended claims.

The invention claimed is:

1. A method for matching a fingerprint image based on Transformer, comprising:
acquiring a fingerprint image to be matched;
obtaining a feature tensor map and a confidence heat map by extracting an initial feature from the fingerprint image to be matched by using an initial feature extraction model, wherein the feature tensor map represents a feature vector of each pixel in the fingerprint image to be matched, and the confidence heat map represents a confidence of each pixel in the fingerprint image to be matched; obtaining an initial point set containing location information and the confidence thereof by performing non-maximum suppression processing on the confidence heat map; obtaining a feature vector set corresponding to the initial point set by traversing the initial point set according to the feature tensor map; obtaining a first feature point set by updating each feature vector in the feature vector set by using a Transformer feature model, wherein the first feature point set comprises the location information, the confidence thereof, and updated feature vectors of all feature points;
generating a matching result by performing, based on a second feature point set of a standard fingerprint image, a Transformer match between the first feature point set and the second feature point set by using a preset number of levels of Transformer matching models; wherein
each level of Transformer matching model has different number of layers; and a matching process thereof comprises: taking each feature point in the first feature point set and each feature point in the second feature point set respectively as input-layer nodes of a first level of Transformer matching model; iterating even-layer nodes by using a self-attention mechanism and iterating odd-layer nodes by using a cross-attention mechanism with an input layer as a starting layer, and performing iteration sequentially until output-layer nodes are obtained; taking the output-layer nodes as corresponding updated feature vectors of the first feature point set or the second feature point set; calculating a matching confidence for each feature point in the first feature point set or the second feature point set according to the corresponding updated feature vectors, wherein a calculation formula thereof is as follows:

$$\sigma_i^I = \frac{1}{1 + e^{w^T * Ix_i + b}}$$

in the formula, $I \in \{A, B\}$, A denotes the first feature point set, B denotes the second feature point set, $Ix_i$ denotes is a feature vector of a feature point i in A or B, $w^T$ denotes a linear transformation matrix, and b denotes an offset of the linear transformation matrix;
performing indicative function calculation on the matching confidence according to a highest probability threshold and a lowest probability threshold, wherein a calculation formula thereof is as follows:

$$\chi(\sigma_i^I > C_H) = \begin{cases} 1, & \sigma_i^I > C_H \text{ is true} \\ 0, & \sigma_i^I > C_H \text{ is false} \end{cases}$$

$$\chi(\sigma_i^I > C_L) = \begin{cases} 1, & \sigma_i^I > C_L \text{ is true} \\ 0, & \sigma_i^I > C_L \text{ is false} \end{cases}$$

in the formula, $C_H$ denotes the highest probability threshold, and $C_L$ denotes the lowest probability threshold;
calculating a matching success probability and a matching failure probability according to an indicative function calculation result corresponding to the first feature point set and an indicative function calculation result corresponding to the second feature point set, wherein a calculation formula thereof is as follows:

$$R_H = \frac{\sum_{i=1}^{m} \chi(\sigma_i^A > C_H) + \sum_{i=1}^{n} \chi(\sigma_i^B > C_H)}{m + n} \in [0, 1]$$

$$R_L = \frac{\sum_{i=1}^{m} \chi(\sigma_i^A < C_L) + \sum_{i=1}^{n} \chi(\sigma_i^B < C_L)}{m + n} \in [0, 1]$$

in the formula, $R_H$ denotes the matching success probability, $R_L$ denotes the matching failure probability, m denotes a number of the feature points in the first feature point set, and n denotes a number of the feature points in the second feature point set; if the match success probability or the matching failure probability is higher than a matching probability threshold, determining the matching result; and if the matching success probability or the matching failure probability is lower than the matching probability threshold, performing a match by inputting the updated feature vectors into a next level of Transformer matching model until the matching result is determined.

2. The method according to claim 1, wherein the step of updating each feature vector in the feature vector set by using a Transformer feature model comprises:
taking each feature vector in the feature vector set as an input-layer node of the Transformer feature model sequentially, wherein the Transformer feature model has a preset number of layers;
generating next-layer nodes by iterating current-layer nodes by using the self-attention mechanism with an input layer as a starting layer, and performing iteration sequentially until output-layer nodes are obtained; and
taking the output-layer nodes as the updated feature vectors corresponding to the feature points.

3. The method according to claim 2, wherein, before the fingerprint image is matched, the method further comprises:
acquiring a transformation relation between two real matched images having a known matching result;
machine-learning and training a Transformer matching process according to the transformation relation based on a matching loss function;
machine-learning and training a confidence heat map extraction sub-process in a Transformer feature extraction process according to the transformation relation based on a confidence heat map loss function formed by a weighted combination of a cosine similarity loss function of the confidence heat map and a sparsity loss function of the confidence heat map;

machine-learning and training the Transformer feature extraction process according to the transformation relation based on a feature extraction loss function formed by a weighted combination of the confidence heat map loss function and a joint loss function of the feature tensor map and the confidence heat map; and jointly machine-learning and training the Transformer matching process and the Transformer feature extraction process based on a comprehensive loss function formed by a weighted combination of the matching loss function and the feature extraction loss function.

4. The method according to claim 1, wherein the step of, if the match success probability or the matching failure probability is higher than a matching probability threshold, determining the matching result comprises:

if the matching success probability is higher than a matching success probability threshold, determining the matching result to be a matching success; and if the matching failure probability is higher than a matching failure probability threshold, determining the matching result to be a matching failure.

5. The method according to claim 1, wherein, if no matching result is determined before a final level of Transformer matching model, determining the matching result by using the final level of Transformer matching model, and a determining process thereof comprises:

obtaining a matchable feature by performing linear projection transformation on an updated feature vector that is output by the final level of Transformer matching model;

calculating matching degrees between the feature points in the first feature point set and the feature points in the second feature point set according to the matchable feature; and obtaining a score matrix by normalizing the matching degrees, and determining the matching result by performing consistency matching calculation by using a preset matching algorithm.

6. A computer device, comprising:

a memory and a processor; wherein the memory is in intercommunication connection with the processor, the memory has computer instructions stored therein, and the processor is configured to execute the computer instructions to perform the method for matching a fingerprint image based on Transformer according to of claim 1.

7. A smart door lock, comprising the computer device according to claim 6.

* * * * *